Nov. 19, 1935.                C. H. BREERWOOD                2,021,623
                              MANUFACTURE OF CEMENT
                              Filed March 17, 1934
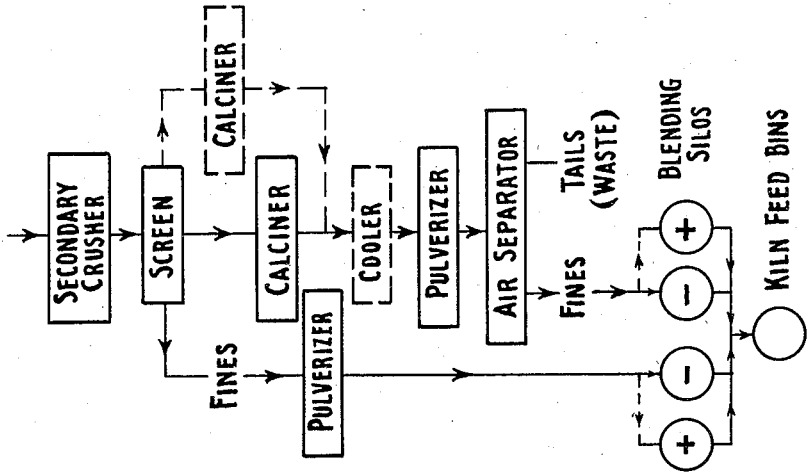
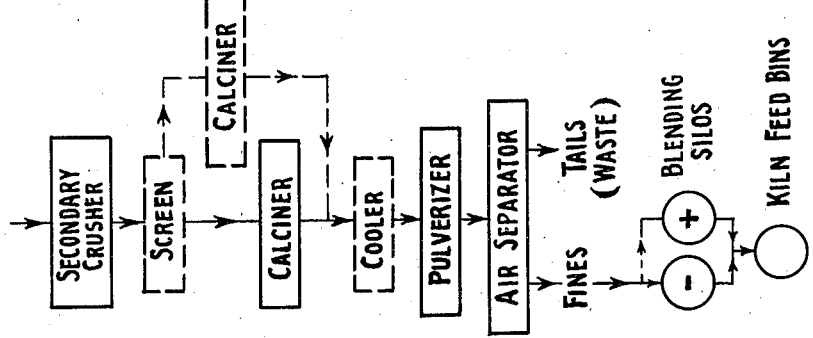
INVENTOR
C. H. BREERWOOD
BY
ATTORNEYS Patented Nov. 19, 1935

2,021,623

UNITED STATES PATENT OFFICE 2,021,623

MANUFACTURE OF CEMENT

Charles H. Breerwood, Narberth, Pa., assignor to Valley Forge Cement Company, a corporation of Pennsylvania Application March 17, 1934, Serial No. 716,121

8 Claims. (Cl. 106—25)

This invention relates to the manufacture of cement, specifically Portland cement, modifications thereof and other cements in which compounds of calcium and silica are the principal constituents.

It is especially concerned with the preliminary treatment of original raw materials, which contain an excess of silica and particularly quantities of this constituent in one or more of its coarse forms, such as quartz. The primary purpose of the new method is to produce an ultimate raw material mixture of superior physical and chemical characteristics, which will react more rapidly, completely and uniformly than mixtures prepared by previous methods, and without adding limestone to the mixture for purposes of correction. To this end, excess or the coarse silicas, which do not combine favorably or at all in the process of burning to clinker, are eliminated from the mixture in a simple and inexpensive manner; the material is reduced to ultimate sizes much finer than those ground in conventional pulverizing practices, and at considerably lower cost, and the calcium carbonate is converted to calcium oxide before delivery to the kiln, a condition which expedites the clinkering reactions. For the purposes of the present invention, the terms "coarse silicas", and "coarse quartz", are intended to define the relatively fine particles occurring in argillaceous limestones, which particles are too fine, too thoroughly bonded and distributed for separation by mechanical means, but are too coarse for favorable combination with calcium, as distinguished from the large particles, ranging in sizes from sand to large lumps of silicas such as flint and chalcedony, which frequently occur in chalks and marls and are removable therefrom by known methods.

Although the invention may be applied to produce suitable mixtures from various original materials, or material components, as will become apparent as the description proceeds, it is of especial advantage in the treatment of inferior cement rocks or argillaceous limestones. The new method makes it possible to prepare a mixture of suitable composition from these inferior stones, without adding relatively pure limestone as a corrective, a conventional practice which is not only excessive and sometimes prohibitive in cost, but which does not necessarily result in the production of finished cement of the desired quality and uniform strength characteristics. For simplicity, the description will be limited to the procedure in preparing standard Portland cement mixtures, but it will be apparent how mixtures of desired ultimate analyses can be effected to produce other cements.

In my Patents Nos. 1,931,921 and 2,006,939, I have explained my discovery that even in cement rock of apparently uniform, fine grained texture, some of the silica frequently occurs in a free state in the form of quartz, too coarse for chemical combination, and that these quartz particles are not sufficiently reduced by conventional methods of grinding. The coarse particles are not only responsible for failure to obtain complete and uniform lime saturation, but they also make both the raw material and finished cement difficult to grind. I have likewise described in detail the effect of the coarse silica on the chemistry of cement, as well as the mechanical aspects of production, with especial reference to the difficulty in grinding the original material, burning the mixture to clinker, and reducing the clinker to cement.

It will be realized that fine quartz is a usable form of silica, but even with the knowledge of the discoveries above described, the chemist has had no practical means for determining how much of the total silica in his material or materials mixture will combine properly, and how much will be present in the finished clinker, as free quartz, and it follows that prior to these inventions no method of eliminating the coarse silicas was available. The lack of uniformity in the available relative quantities of combinable and uncombinable silica not only accounts for variations in strength and uniformity of the finished cement, but also explains why the theoretical upper limit of calcium carbonate content could not be employed in practice heretofore to produce a sound cement of high early and ultimate strength characteristics, with little or no unfavorable caustic lime content.

Substantially all of the known cement rocks of Eastern Pennsylvania and New Jersey are deficient in calcium carbonate, excessive in silica content and contain the constituents alumina and iron. A part, at least, of the silica occurs in one or more of the coarse forms, particularly quartz. Some of this stone is usable by the addition of relatively pure forms of limestone or calcite, but this practice, as pointed out above, and in my patents referred to, does not necessarily solve the serious chemical problem resulting from the incomplete reaction due to the presence of coarse particles of quartz in the final mixture, and it will be apparent that its most serious disadvantage is the cost of adding the corrective. As the majority of cement chemists are generally familiar with the rocks occurring in this district, the application of the new method will be explained by describing the procedure in treating typical specimens, as examples, so that chemists can readily determine the proper procedure in treating these as well as other available raw materials.

Among other materials closely related to those described above, some of which occur in the same area, are those in which the original material mixture comprises two components, one of which is principally lime-bearing and the other principally siliceous. The lime-bearing material, although it may be far beyond the required purity in so far as calcium carbonate is concerned, may and frequently does contain silica in one or more of the coarse forms which should be eliminated from the mixture in order to increase the degree of reaction in the kiln. This method makes it possible to employ such stones, either as an important component of the mixture, or as a corrective.

As in the case of my inventions referred to above, the chemist is offered a wide latitude of control of the proportions of the constituents available in his raw materials. He can, accordingly, produce excellent cements of uniform quality and strength from available materials heretofore unusable or unsuitable for cement manufacture in accordance with methods known heretofore, excepting those described in my patents. The new method thus makes available for cement manufacture vast quantities of materials heretofore considered unusable or inferior.

The ultimate mixture produced in accordance with the present process will be especially suitable for cement manufacture; first, because the proportions will be correct; second, it will comprise only those forms of the constituents which will react properly; third, the particles will be in an extremely fine state of sub-division and in intimate contact; and fourth, at least a part of the calcium will be in a more readily combinable form than calcium carbonate.

The new procedure can be applied to dry process cement mills with little change in the existing equipment, and without adding to and in most cases economizing in production costs, exclusive of saving the cost of purchased limestone, as compared with conventional practice. Likewise, the capacity of the available equipment is not decreased, and in many cases the output can materially be increased without adding to the cost of production.

In general, the method comprises crushing the stone preferably to conventional secondary crusher sizes, and so that the resulting product is as nearly uniform in size as can be had with reasonable economy. This raw rock is then subjected to a heat treatment, and maintained at a temperature and for a sufficient length of time to obtain a substantially complete ignition loss or conversion of the calcium carbonate to calcium oxide. This step is somewhat critical, and should not be confused with the practice in burning limestone to produce caustic lime, for although there are points of similarity, reactions unfavorable to the present process may occur, which decrease the effectiveness of this step of the new method.

Calcination reduces the physical bond between the calcium and silica, and any other constituents that may be present, and makes the rock soft and frangible. In this condition it may readily be reduced by very simple pulverizing methods. The mill should be of a type which will disintegrate the softer compounds without materially reducing the particle sizes of the hard siliceous matter; i. e., the quartz of the present example.

In milling the calcined rock, the calcium oxide breaks down to impalpable powder, whereby this constituent is both physically and chemically in an especially suitable form for the clinkering reactions. The argillaceous compounds do not tend to agglomerate during the heat treatment, and as the iron and alumina compounds are softer than the quartz, they are easily pulverized, leaving the quartz substantially in its original particle sizes.

Prior to calcination, the "grindability" of the lime compounds and of siliceous matter in the raw rock do not differ sufficiently in degree to obtain, by conventional methods of pulverizing, radical differences in particle sizes of the lime and silica. Calcination prior to milling does, however, result in the wide variation in the particle sizes described, and it necessarily follows that this difference in sizes facilitates classification.

It is also to be understood that the increase in grindability, due to calcination, so reduces the cost of pulverizing that the cost of calcining the rock is more than off-set.

The product of the pulverizer is mechanically classified according to size, as by means of air separators. This permits the separation and the elimination of the coarse or excessive quantities of silica as tailings, the lime, present as fine calcium oxide, together with the alumina and iron, being discharged and recovered and employed in or as the ultimate mixture.

Although the proportion of the silica discharged with the other fine constitutents can be regulated by adjusting the degree of classification, this method of preparing the final mixture is not practical, excepting in the rare cases wherein the material delivered to the separator remains fairly constant in composition over an extended period. It is, accordingly, preferable to eliminate the unfavorable quantities and sizes of silicas and ultimately to proportion and blend fine products of high and low calcium values to correct the proportions of the mixture. It is to be understood that in accordance with this procedure, the degree of calcium recovery and silica elimination can be carried, if desired, far beyond the desired analysis of the ultimate mixture, in order to produce a product which can be employed as a high lime component or as a corrective with other materials, either similarly treated, or prepared in accordance with conventional methods.

As the primary purpose of the heat treatment is to make the quartz separable as described above, calcination to the same degree as in producing caustic lime is not always essential in order to produce an adequate calcium recovery.

The calcined material should be pulverized and classified, preferably before its temperature has been reduced to a degree at which hydration, due to air slaking or other causes may begin. Although it might appear from previous knowledge in the preparation of hydrated lime, lime mortars and lime-cement mortars that hydration would be desirable in order that the reaction would further reduce the particle sizes of the lime, my investigations have shown that unfavorable reactions take place, particularly between the lime and silica, but to some extent between the lime and alumina also. This is especially true of the treatment of the lower grade cement rocks, in which some fine silicas are present. These premature reactions form calcium silicates having characteristics similar to natural or Rosendale cements, and they interfere with the separation and control of the mixture, and particularly the degree of calcium recovery. Hydration may be of advantage only when all of the silica occurs as a coarse quartz, and this is practically limited to high grade limestones.

The invention can best be understood by description of the treatment of specific examples of cement rock or argillaceous limestones to produce a desired Portland cement mixture, and reference is made to the accompanying drawing, wherein incidental and alternative steps are indicated in dotted lines, and in which:

Fig. 1 is a flow diagram, showing a preferred method of treating the raw material, and Fig. 2 is a slightly modified application of the invention, of advantage where the nature of the material and the equipment available makes this procedure more economical.

As an example of the cement rock, which may advantageously be treated in accordance with the flow diagram of Fig. 1, a cement rock quarried at Evansville, Pa., is cited as a typical specimen. This rock contains all of the essential constituents, but is deficient in calcium carbonate and excessive in silica. A part of the silica occurs in the form of relatively coarse quartz. The analysis of this material is as follows:

| | |
|---|---|
| $SiO_2$ | 17.00 |
| *$R_2O_3$ | 5.10 |
| $CaCO_3$ (CaO 39.76) | 71.00 |
| MgO | 2.53 |
| Ratio | 3.33 |

*Iron and alumina.

This rock is first reduced to secondary crusher sizes, the crusher being preferably so arranged that the product will be as nearly uniform in size as possible, so that it will respond uniformly to the heat treatment to be described hereinafter. I have discovered that in view of mechanical limitations in varying the time interval of calcining, sizes ranging from one-half inch to three-quarter inch ring are most satisfactory, but it will be understood that other sizes may be employed with variations in the heat treatment, as will be described later.

Instead of pulverizing the secondary crusher product in accordance with conventional practice, it is subjected to calcination. This is one of the most important and most critical steps in the new method, and it comprises raising the temperature of the rock and maintaining it for an interval of time sufficient to liberate the carbon-dioxide. This ignition loss breaks the physical bond between the particles of lime and silica, and changes their relative grindability, and makes the rock soft and frangible. For rock of any specific composition, the temperature and interval of heating depend largely upon the size of the crusher product. Rock of this size, analysis and characteristics when heated to 1800 degrees Fahrenheit, and maintained at this temperature for approximately two hours, reached the required degree of calcination without material combination between the lime and silica. The same rock with particle sizes ranging from one-eighth inch to three-eighths inch ring, heated for two hours at a temperature of approximately 1600 degrees Fahrenheit, reached the proper degree of calcination without material reaction. It is important that neither the temperature nor the time interval of heating should exceed materially the minimum necessary for the purposes described, as over-burning may limit the separation of the silicas, due to lime-silica reactions.

The temperature and time interval can best be determined by experiment, and the necessary preliminary information obtained by a simple procedure and with the equipment available in all cement laboratories. This procedure will be described in detail hereinafter.

The apparatus employed for calcining may be of any suitable type heretofore used for the production of caustic lime. In dry process cement mills in which waste heat dryers are used, the dryers can usually be converted to this service. It will be understood that as compared with conventional practice, the output of the clinker kiln can almost be doubled. This is due to the fact that in previous practice, the raw material is first heated to pre-calcination temperatures, then calcined and ultimately raised and maintained at the temperature necessary to burn or produce clinker. In the present process, however, calcination takes place before the materials are delivered to the kiln, and it is only necessary to bring them up to and maintain them at the burning temperature to convert them to clinker. The kiln may, accordingly, be fired at a greater rate, and the consequent increase in exit gas temperatures may profitably be employed to raise the temperature in the converted dryer. If the exit gas temperature of the kiln is too low to produce the desired degree of calcination, additional heat can be applied by means of a pilot flame. This may be a powdered coal flame supported by the additional air necessary to complete combustion, this secondary air being of relatively small volume, in view of the fact that the materials delivered to the kiln liberate relatively little carbon-dioxide, in view of the preliminary substantially complete calcination.

Where waste heat dryers are not available, one or more of the cement kilns may be employed substantially without modification, except in the rate of firing. As it will be used merely for calcination, its output can be increased considerably beyond that obtained in producing cement clinker. If the kilns available for calcination and final burning are of substantially the same size, about the same capacity in clinker can be produced as in conventional practice, if those employed as calciners and clinkering kilns are in a ratio of 2 to 3.

The calcined rock, preferably after cooling sufficiently to permit satisfactory mechanical handling, in a rotary or other conventional cooler, is then disintegrated in a pulverizer mill. Among the types of mills that can be employed favorably for this purpose are impact or paddle type mills, now commonly used for pulverizing bituminous coal for combustion purposes.

These mills have the advantage of high capacity in reducing soft materials, without materially breaking down hard substances, such as the quartz of the present example. In addition, they suspend the discharge materials in an air stream, from which they can readily be separated or classified, as described hereinafter.

Likewise attrition mills of various types may be used, such as tube mills, charged with a relatively small quantity of light grinding media. These media may comprise flint pebbles or small metallic grinding elements, and the charge and material are preferably turned by ribs or elevators, secured to the wall of the mill, parallel to the axis. It will be realized that whatever type of mill is used, its capacity will be vastly greater than that of conventional types of equivalent power consumption, when grinding raw rock, in view of the increased grindability of the lime as a result of calcination.

The mill discharge, transported by the usual fan of the impact mill, or air swept or otherwise delivered from the attrition mill is then collected and delivered or directly discharged into a conventional form of classifier or an air separator, preferably of the centrifugal type. As the quartz, and some of the other silicas are difficult to pulverize, it remains relatively coarse and may readily be separated from the stream entering the classifier or separator. The separator is so adjusted that this excessive quantity represented by the coarser particles of quartz is discharged as tailings, and is thus eliminated from the final mixture. The fines discharged from the separator will be suitable for burning and in the example cited, the fines determined by actual experiment, (lime also expressed as $CaCO_3$ for purposes of comparison) have the following analysis:

| | |
|---|---|
| $SiO_2$ | 12.50 |
| $R_2O_3$ | 5.34 |
| $CaCO_3$ (CaO 41.63) | 74.34 |
| MgO | 2.64 |
| Ratio | 2.34 |

In addition to the correction of the silica-lime ratio, the silica-iron-alumina ratio has been reduced from 3.33 to 2.34. This same rock specimen can easily be converted to a high lime corrective by increasing the degree of separation or classification. Although this practice results in a greater volume of waste; i. e., tailings, it is not necessarily uneconomical as it will be realized that very little work has been expended in preparing the rock up to this point. Thus, by discarding all particles, greater than 325 mesh fineness, I have increased the calcium oxide value from 61.75 percent to 75.15 percent, and reduced the silica content from 26.40 percent to 10.42 percent. By reference to the original analysis of the raw rock, it will be seen that the above is a comparison between the analysis of the calcined material and the analysis of the fines recovered.

This mixture corrected for coal ash on the basis of one part to thirty-seven parts of clinker would result in a cement of the following analysis:

| | |
|---|---|
| $SiO_2$ | 21.15 |
| $R_2O_3$ | 9.40 |
| CaO | 65.33 |
| MgO | 4.19 |
| Ratio | 2.25 |

By the addition of gypsum and absorption of water, the lime is further reduced to approximately 63.50 percent. The above Portland cement is ideal in composition.

A considerably different type of rock, and one requiring a somewhat modified procedure is one of the several forms occurring in Northampton county, Pennsylvania, and which has the following analysis:

| | |
|---|---|
| $SiO_2$ | 17.80 |
| $R_2O_3$ | 4.46 |
| $CaCO_3$ | 75.00 |
| MgO | .65 |
| Ratio | 3.99 |

It will be seen from the above that in this rock the lime content is substantially correct, being merely a few tenths of a percent below standard. However, the ratios are impossible. The rock may be made usable, however, by processing as above described, to remove a part of the silica. This raises the lime content to the equivalent of a high lime cement rock, containing only combinable silica, and which can be used by adding a small quantity of clay, for example, as a corrective. The clay should be first dried, either separately or by its addition to the original materials prior to calcination. In either case, it is preferred to pulverize both the clay and the calcined material simultaneously in order to increase the degree of mixture, and contact between the particles of all constituents entering into the final mixture, and in addition to remove any coarse silica occurring in the clay when the mixture is classified. Thus, this material, after processing experimentally had the following analysis:

| | |
|---|---|
| $SiO_2$ | 10.80 |
| $R_2O_3$ | 4.80 |
| CaO ($CaCO_3$ 80.63) | 45.15 |
| MgO | .70 |
| Ratio | 2.35 |

It will be seen from the above that the silica has materially been reduced, and the lime value increased, and that the ratio has been improved. By mixing thirteen parts of this material to one part of clay of normal analysis as follows:

| | |
|---|---|
| $SiO_2$ | 65.00 |
| $R_2O_3$ | 30.00 |
| CaO | 3.00 |
| MgO | 1.00 |
| Ratio | 2.17 |

The final raw material mixture will have the following analysis:

| | |
|---|---|
| $SiO_2$ | 14.67 |
| $R_2O_3$ | 6.60 |
| CaO ($CaCO_3$ 75.07) | 42.04 |
| MgO | .72 |
| Ratio | 2.22 |

The correction of the silica-iron-alumina ratio from 3.99 to 2.22 is especially notable.

The following rock specimen, obtained in Northampton county, Pennsylvania, would be an excellent lime corrective, excepting for the presence of a large amount of relatively coarse quartz. It had the following analysis:

| | |
|---|---|
| $SiO_2$ | 10.52 |
| $R_2O_3$ | 1.12 |
| $CaCO_3$ | 87.40 |
| MgO | .68 |
| Ratio | 9.39 |

By processing this rock as above described, the coarse silica is readily removed, and the recovered product can be employed as a corrective for use with a treated or untreated material, inferior in calcium, or it may be corrected by the simple addition of combinable silica, iron and alumina in the form of clay or shale.

Although it would appear that the reduction of this and similar specimens can be accelerated and the separation increased in degree by steam or water-spray hydration, in a manner well-understood in the art of preparing lime and lime-cement mortars, this practice is not desirable. Although the last specimen referred to can be further reduced by hydration, because it contains little or no fine silica, the inferior cement rocks or limestones, with which this application is especially concerned, should not be so treated. A material, such as the first specimen discussed, should not be hydrated, as the quantities of fine silica, iron and alumina present would react to some degree and some "setting" would result, because the constituents and their proportions are similar to Rosendale cement. These reactions decrease the degree of calcium recovery and silica elimination.

In the commercial processing of materials, including each of the specimens above described, it will be realized that it is desirable to obtain an ultimate product, the particle sizes of which are all sufficiently fine to react in the process of burning to clinker. For this reason, and also for the purposes of economy in both power and calcium values discarded with the separator tailings, it is desirable to adjust the rate of feed to the pulverizer mill to obtain a maximum output of fines within economical limits of power consumption. As has been explained above, the control of the relative quantity of silica in the fines recovered from the separator may be obtained by adjusting the latter so that the fines discharged will be of the proper proportions, with especial reference to lime and silica.

However, in actual practice, it will be understood that the composition of the calcined rock, as delivered to the pulverizer, and ultimately to the separator, will vary from time to time not only as to the proportions of the constituents present, but also in the relative quantities of combinable and uncombinable silica. Obviously, it is not practical, in view of the delay in analyzing the fines delivered from the separator to control the ultimate analysis solely by manipulating its discharge.

Accordingly, to create a supply of material properly mixed for burning in the kiln, I prefer to adjust the separator so that all of the uncombinable silicas are eliminated as tailings. The resulting fine product will accordingly vary in calcium content as the composition of the rock varies. This has the additional advantage of avoiding the disproportionate amount of power that would be necessary to reduce a part of the quartz to fine sizes in order to complete a mixture deficient in combinable forms of silica.

The fines recovered from the separator are preferably conveyed to blending silos in which separate bins are provided for separator products of high calcium values and others of low calcium value, as compared to the desired standard. These products can then be proportioned and blended to produce an ultimate composition of the desired analysis by methods well understood in the art, such as that described in Morrow Patent No. 1,812,604, for example.

If storage facilities are available for the product of the secondary crusher, in which materials can be segregated both in accordance with general variations in composition, as well as variations in size, the rock may be blended prior to calcination, and in many cases this will eliminate or simplify blending of the separator product.

In order to avoid over-calcination of the finer sizes and under-calcination of the coarser products of the secondary crusher, either of which will limit the degree of calcium recovery and silica elimination, the secondary crusher product is preferably graded as by screening, so that similar sizes can be separately calcined. This can be accomplished by providing two or more calciners through which the products may pass at rates corresponding to their size, or at constant rates, but variable temperatures or by calcining the different sizes in separate batches. It will appear that materials so treated may be pulverized separately or combined and reduced together to suit local convenience.

A slightly modified form of the method is illustrated in Fig. 2. It is applicable economically to plants where the available capacity of the calcining equipment is limited, and where the nature of the rock is such that the secondary crusher produces relatively large quantities of fines or particle sizes requiring only limited further reduction to make them suitable for burning to clinker.

As referred to above, wide variation in particle sizes makes the secondary crusher product unsuitable for simultaneous calcining. Accordingly, where the calcining equipment is limited, I prefer to pass the product of the secondary crusher over a screen to separate the fine particles. These particles are then reduced to the proper size in a conventional type of raw material pulverizer, and are not further processed prior to mixing with the treated product, as described hereinafter.

The coarse products, preferably of approximately uniform size, are then calcined, disintegrated in the pulverizer, and then separated by classification, so that the coarse silicas may be eliminated from the ultimate mixture, in a manner similar to that described above, and illustrated in Fig. 1. The recovered fines and the untreated product are then proportioned and blended to produce an ultimate mixture of the desired composition.

This modification of the method has two disadvantages; first, the uncombinable silicas are not wholly removed from the ultimate mixture, and although the latter may be superior in this respect to a similar mixture created by the conventional practice of adding limestone, the reaction in burning will be less certain and the resulting product less uniform than that produced by the preferred procedure. The second disadvantage is that the cost of pulverizing the untreated fines is considerably greater than that of reducing the calcined product.

It is to be understood that it is not necessarily my intention in either form of the present process to discard silica in the form of a quartz in a fine state of sub-division, a condition in which this essential constituent combines readily, and at normal kiln temperatures, but to remove and eliminate either the excessive quantities or uncombinable silicas, to avoid the chemical problems described, the expenditure of the disproportionate amount of the power necessary to reduce it, and in most cases to eliminate the tremendous expense of adding relatively pure limestone to the mixture. It will be seen that the process produces a correct mixture, of unique advantage in burning to clinker, particularly in view of the fine state of sub-division of the particles and the presence of calcium as calcium oxide rather than calcium carbonate. It will also be understood that many inferior cement rocks contain silica in such great quantities that the elimination of the coarser forms involves only a partial correction of the composition. These materials may be used, however, by adding properly proportioned quantities of materials prepared as described above, and excessive in calcium, or by adding limestone obtained from other sources. If limestone is so added, it should be introduced prior to calcining, in order to obtain the benefit of reducing this corrective at low cost, and at the same time to eliminate any uncombinable silicas that may be present in it. Likewise, this practice increases the degree of blending and contact between particles, as they are pulverized simultaneously.

The temperature and time interval required for the proper calcination of any available raw material can easily be determined experimentally with reasonable accuracy. In making this determination, it should be borne in mind that these factors vary both with relation to particle size and composition. The larger the particles of any specific material, the greater either the temperature or time, or both. Especially if fine silicas are present, over-calcination with respect to either time or temperature will result in premature reactions, especially between lime and silica. Under-calcination will decrease the degree of calcium recovered and silica elimination. Samples of the crushed rock are graded according to size and calcined in a laboratory electric furnace at temperatures ranging from slightly above the theoretical ignition temperature of calcium carbonate; i. e., approximately 1600 degrees to 2000 degrees, Fahrenheit. Each size is likewise maintained at these temperatures for various intervals, which ordinarily do not exceed three hours for normal maximum secondary crusher sizes. For instance, as will be recalled, the first specimen described of one-half to three-quarter inch ring sizes, was properly calcined when maintained at a temperature of 1800 degrees for two hours.

The samples are then ground in a mortar, preferably with a wooden pestle, to avoid breaking down the quartz particles, to reduce the samples to kiln fineness. Then by screening the ground material, employing preferably a 325 mesh sieve, the proper degree of calcination will be apparent in the sample in which the separated fines show a maximum line recovery with relation to total silica, and in which the residue contains the least calcium, indicating that there has been a minimum of reaction between calcium and silica.

As an alternative to this experiment, the calcined samples, while still hot, may be submerged in ten to fifteen times their volume of water, and if not over or under calcined, the calcium oxide will be hydrated, disintegration being complete usually within a minute or two. The mass is then stirred briefly, and allowed to settle, usually for about 45 seconds, until the supernatant liquid is white. The latter is then decanted, and reserved for analysis, water is added to the mass, which is again suspended by stirring and allowed to settle for a few seconds and again decanted. The sample having the highest calcium value in the first and second decantings, and the least calcium value in the final residue will be the one which most nearly approaches the desired calcination.

I claim:

1. The method of preparing a cement raw material mixture of a desired analysis from inferior argillaceous limestones, deficient in calcium carbonate and excessive in silica, some of the silica being in a form too coarse for favorable combination with the calcum in the process of burning to clinker, which comprises crushing the stone to a size suitable for calcination, calcining the stone to a degree sufficient to convert substantially all of the calcium carbonate to calcium oxide, but short of a degree causing material calcium and silica reactions, converting the calcium compounds to powder without materially reducing the coarse silica, separating the fine constituents of the stone from the coarse silica, discarding the coarse silica, recovering the fine constituents, porportioning and mixing the necessary quantities of these constituents with other fines of different analysis to blend a mixture of the desired analysis.

2. The method of preparing a cement raw material mixture, of predetermined ultimate analysis, physically and chemically suitable for burning from inferior argillaceous limestone containing an excess of silica, some of which is in the form of quartz particles too coarse for favorable chemical reactions in burning to clinker, which comprises crushing the stone to sizes suitable for calcining, calcining the rock to a degree sufficient to convert substantially all of the calcium carbonate to calcium oxide to reduce the physical bond between the calcium, quartz and other constituents and to convert the calcium to a more readily combinable form, pulverizing the calcined rock in a manner whereby the quartz is not materially reduced in fineness and the calcium oxide, iron and alumina are reduced to suitable fineness, separating the fine and coarse particles, discarding the coarse particles to eliminate the coarse quartz, recovering the fine constituents of the stone, proportioning and mixing the necessary quantities of these fines with other fines of different analysis to blend a mixture of the desired ultimate analysis.

3. The method of preparing a cement raw material mixture from inferior argillaceous limestones deficient in calcium carbonate and containing an excess of silica, some of which is in the form of quartz particles too coarse for favorable combination with calcium in the process of burning to clinker, which comprises crushing the stone to secondary crusher sizes, separating the coarse from the finer sizes, pulverizing the finer sizes to usual raw material fineness, calcining the coarse sizes, reducing the calcined stone in a manner whereby the calcium particles are rendered fine without materially reducing the quartz, separating the fine calcium and other constituents from the coarse quartz, discarding the coarse quartz, and proportioning and mixing the necessary quantities of these fines with the raw fines to blend a mixture of the desired analysis.

4. The method of treating an argillaceous limestone containing the constituents calcium carbonate, silica, iron and alumina, and in which at least a part of the silica occurs in the form of quartz particles too coarse for favorable combination in the process of burning to clinker, to eliminate such quartz particles and to reduce the particle sizes of the other constituents, which comprises crushing the materials to sizes suitable for calcining, calcining the materials to a degree sufficient to liberate substantially all of the carbon dioxide to reduce the physical bonds between the calcium and other constituents, but short of a degree sufficient to cause material calcium and silica reactions, pulverizing the material in a manner whereby the quartz particles are not materially reduced and the other constituents are rendered suitably fine for burning, air separating the fine and coarse particles to eliminate said quartz, and recovering the fine constituents.

5. The method of preparing a cement raw material mixture from an inferior argillaceous limestone containing the constituents calcium carbonate, silica, iron and alumina, but in which at least a part of the silica occurs in the form of quartz particles too coarse for favorable combination in the process of burning to clinker, and in which the constituents are present in unsuitable proportions and ratios, to eliminate such coarse quartz particles and to reduce the particle sizes of the other constituents, which comprises crushing the material to sizes suitable for calcining, calcining the material to a degree sufficient to liberate substantially all of the carbon dioxide to reduce the physical bond between the calcium and other constitutents, but short of a degree sufficient to cause material calcium and silica reactions, pulverizing the material in a manner whereby the said coarse quartz particles are not materially reduced and the other constituents are rendered suitably fine for burning, separating the fine and coarse particles to eliminate the quartz, varying the degree of quartz elimination by modifying the degree of classification by the separator, and recovering the fine constituents.

6. The method of preparing a cement raw material mixture from an inferior argillaceous limestone, containing the essential constituents for cement manufacture, but in unsuitable proportions and ratios, and in which at least a part of the silica occurs in the form of quartz particles too coarse for favorable combination with calcium in the process of burning to cement clinker, without adding quantities of a constituent obtained from another source, which comprises crushing the stone to a size suitable for calcining, calcining the stone to a degree sufficient to convert substantially all of the calcium carbonate to calcium oxide, but short of a degree causing material calcium and silica reactions, converting the calcium compounds to particle sizes suitable for burning to clinker, without materially reducing said quartz, air separating the fine calcium compounds from the coarse quartz, discarding the latter, and recovering the said fine constituents.

7. The method of preparing a cement raw material mixture from an inferior argillaceous limestone, deficient in calcium carbonate, and containing an excess of silica in the form of quartz particles too coarse for favorable combination with calcium in the process of burning to cement clinker, which comprises crushing the stone to sizes suitable for calcining, grading the crushed stone according to sizes, separately calcining the graded sizes to a degree sufficient to convert substantially all of the calcium carbonate to calcium oxide, but short of a degree causing material calcium and silica reactions, converting the calcium compounds to particle sizes suitable for burning to clinker without materially reducing the coarse quartz, separating the fine calcium compounds and other constituents from the coarse quartz and discarding the latter.

8. The method of preparing a cement raw material mixture, of predetermined ultimate analysis, physically and chemically suitable for burning from original materials, at least a part of which is an inferior argillaceous limestone, containing silica, some of which is in the form of quartz particles, too coarse for favorable chemical reaction in burning to clinker, which comprises crushing the argillaceous limestone to sizes suitable for calcining, calcining the rock to a degree sufficient to convert substantially all of the calcium carbonate to calcium oxide to reduce the physical bond between the calcium compounds, quartz and other constituents, and to convert the calcium to a more readily combinable form, pulverizing the calcined rock in a manner whereby the quartz is not materially reduced in fineness, and the calcium oxide, iron and alumina are reduced to suitable fineness, separating the fine and the coarse particles, discarding the coarse particles to eliminate the coarse quartz, recovering the fine constituents of the stone, proportioning and mixing the necessary quantities of these fines with other fines of different analyses to blend a mixture of the desired ultimate analysis.

CHARLES H. BREERWOOD.